US012755164B2

(12) United States Patent
Wang et al.

(10) Patent No.: US 12,755,164 B2
(45) Date of Patent: Oct. 6, 2026

(54) MULTIPLE LIBRARY DEPENDENCY DETECTION

(71) Applicant: International Business Machines Corporation, Armonk, NY (US)

(72) Inventors: Jin Wang, Xi'an (CN); Lei Gao, Xi'an (CN); A Peng Zhang, Xi'an (CN); Kai Li, Xi'an (CN); Xin Feng Zhu, Xi'an (CN); Geng Wu Yang, Xi'an (CN); Jia Xing Tang, Xi'an (CN); Yan Liu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 1045 days.

(21) Appl. No.: 17/943,398

(22) Filed: Sep. 13, 2022

(65) Prior Publication Data

US 2024/0086730 A1 Mar. 14, 2024

(51) Int. Cl.
*G06F 8/70* (2018.01)
*G06N 5/022* (2023.01)

(52) U.S. Cl.
CPC .................................... *G06N 5/022* (2013.01)

(58) Field of Classification Search
CPC .......................................................... G06F 8/70
See application file for complete search history.

(56) References Cited

U.S. PATENT DOCUMENTS

| | | | | |
|---|---|---|---|---|
| 11,461,079 | B2 * | 10/2022 | Nagao | G06F 8/70 |
| 2016/0117413 | A1 | 4/2016 | Botea et al. | |
| 2020/0053116 | A1 * | 2/2020 | Soroush | H04L 43/045 |
| 2020/0285488 | A1 * | 9/2020 | Yao | G06F 8/36 |

(Continued)

FOREIGN PATENT DOCUMENTS

| | | |
|---|---|---|
| CN | 111190641 A | 5/2020 |
| CN | 111240719 A | 6/2020 |

(Continued)

OTHER PUBLICATIONS

Nguyen, P., et al., "CrossRec: Supporting Software Developers by Recommending Third-party Libraries", Journal of Systems and Software, Nov. 2019, 55 pages.

(Continued)

*Primary Examiner* — Jae U Jeon
(74) *Attorney, Agent, or Firm* — Scully, Scott, Murphy & Presser, P.C.; Tihon Poltavets

(57) ABSTRACT

At least one processor identifies dependency relationships among libraries in a repository of libraries. Using the dependency relationships among libraries, at least one machine learning model can be created that predicts with a confidence value a dependency between a given library and a target library. An L layer tree-like graph can be created, using the dependency relationships among libraries and an application package. L can be configurable. Versions of the libraries to use can be determined by running the at least one machine learning model for each pair of nodes having a dependency relationship in the L layer tree-like graph, the at least one machine learning model identifying the dependency relationship with a confidence value, where pairs of nodes having largest confidence values are selected as the versions of the libraries to use in the application package.

20 Claims, 4 Drawing Sheets

(56) References Cited

U.S. PATENT DOCUMENTS

| | | | | |
|---|---|---|---|---|
| 2021/0075814 | A1 * | 3/2021 | Bulut | H04L 63/1433 |
| 2021/0209446 | A1 * | 7/2021 | Shi | G06N 3/0464 |

FOREIGN PATENT DOCUMENTS

| | | | |
|---|---|---|---|
| CN | 112965913 | A | 6/2021 |
| WO | 2022116437 | A1 | 6/2022 |

OTHER PUBLICATIONS

Wikipedia, "Association rule learning", https://en.wikipedia.org/wiki/Association_rule_learning, Last edited on Aug. 19, 2022, 16 pages.

No Author, "Maven Repository", https://web.archive.org/web/20250209083325/https://mvnrepository.com/, Feb. 9, 2025, 7 pages.

* cited by examiner

MULTIPLE LIBRARY DEPENDENCY DETECTION

BACKGROUND

The present application relates generally to computers and computer applications, and more particularly to detecting dependencies among libraries or library functions in computer codes. The present application also relates to machine learning-based detection of dependencies in library functions, which may include nested dependencies, for example, a library function calling another library function.

In developing computer codes, a developer may import third-party libraries into the computer codes. Libraries in computer programming are collections of prewritten code or routines that users can use to develop a program or code. For example, programming languages such as JAVA, Python and/or others can have libraries built for use. Such libraries or versions of libraries imported into a computer code should be compatible in use with one another. Incompatibility among the imported libraries in a computer code can produce compilation and/or runtime errors in a computer environment.

BRIEF SUMMARY

The summary of the disclosure is given to aid understanding of a computer system and method of detecting dependencies among multiple libraries, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in an aspect, can include identifying, by at least one computer processor, dependency relationships among libraries in a repository of libraries. The method can also include creating at least one machine learning model that predicts with a confidence value, a dependency between a given library and a target library, using the dependency relationships among libraries. The method can further include creating an L layer tree-like graph, using the dependency relationships among libraries and an application package, where L can be configurable. The method can also include determining versions of the libraries to use by running the at least one machine learning model for each pair of nodes having a dependency relationship in the L layer tree-like graph, the at least one machine learning model identifying the dependency relationship with a confidence value, where pairs of nodes having largest confidence values are selected as the versions of the libraries to use in the application package.

A system, in an aspect, can include at least one processor and a memory device coupled with the at least one processor. At least one processor can be configured at least to identify dependency relationships among libraries in a repository of libraries. At least one processor can also be configured to create at least one machine learning model that predicts with a confidence value, a dependency between a given library and a target library, using the dependency relationships among libraries. At least one processor can also be configured to create an L layer tree-like graph, using the dependency relationships among libraries and an application package, where L can be configurable. At least one processor can also be configured to determine versions of the libraries to use by running the at least one machine learning model for each pair of nodes having a dependency relationship in the L layer tree-like graph, at least one machine learning model identifying the dependency relationship with a confidence value, where pairs of nodes having largest confidence values are selected as the versions of the libraries to use in the application package.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
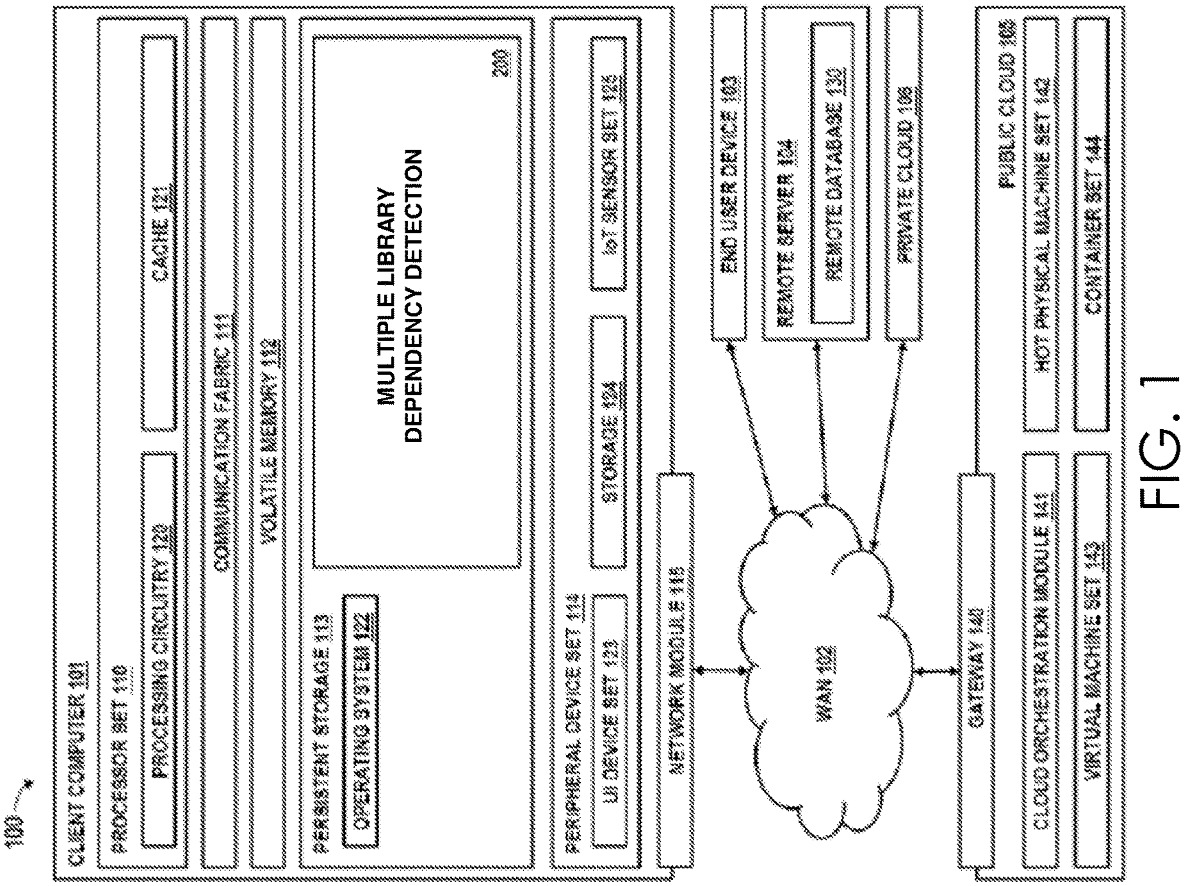
FIG. 1 illustrates a schematic of an example computer or processing system that may implement a multiple library detection system according to an embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as multiple library dependency detection code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In one or more embodiments, systems and methods can perform a machine learning-based detection of library dependencies, for example, identify dependencies among libraries or functions such as those provided in public library repositories, and acquire useful and compatible combinations of libraries and/or versions of libraries, which can be used in coding. The systems and methods can also check for any indirect conflicts, for example, using a tree search technique. In one or more embodiment, systems and methods can intelligently analyze the relationship among different libraries, for example, using machine learning based on the public library repository to acquire the useful combination. In one or more embodiments, the systems and methods can also update or correct, and record combinations of libraries that fail or are not compatible to work together.

Figure 2:
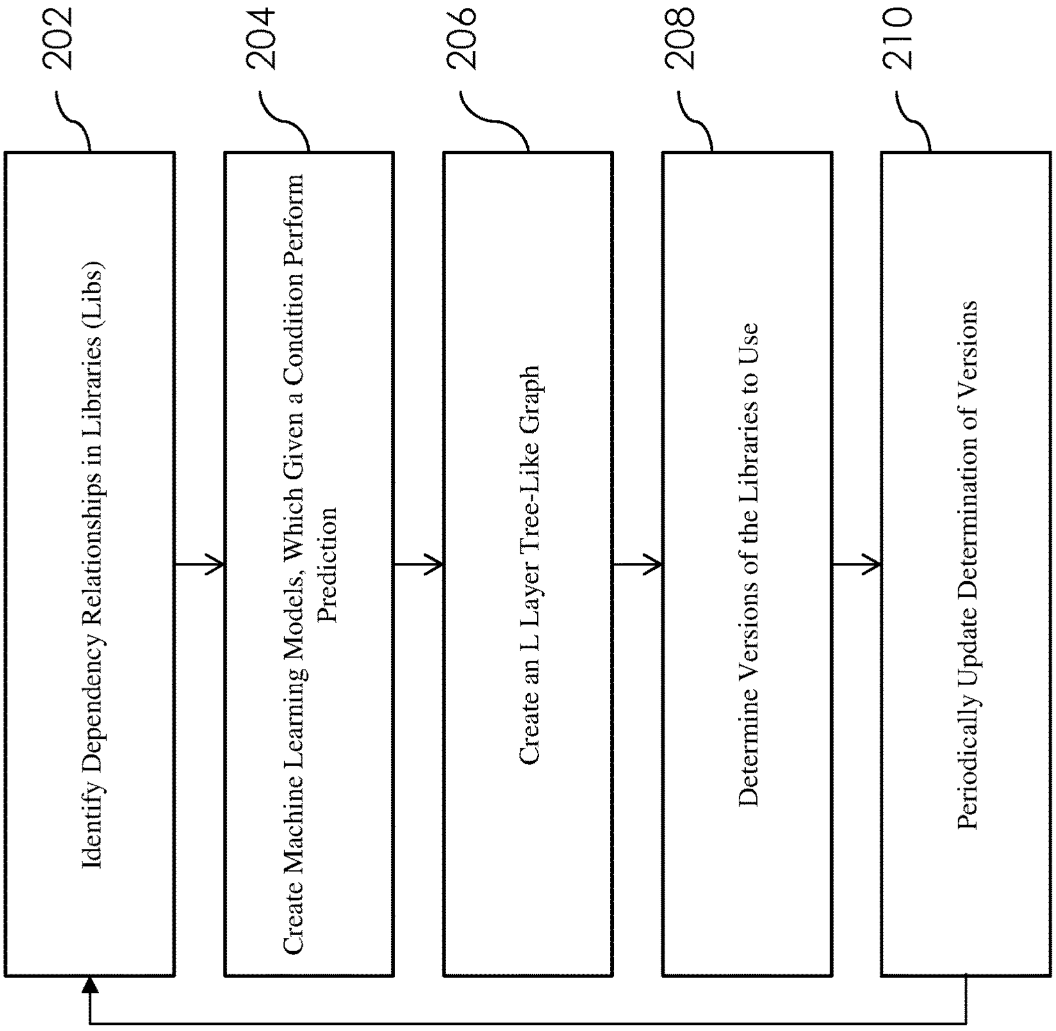
FIG. 2 is a diagram illustrating a method in an embodiment of detecting multiple library dependencies.

FIG. 2 is a diagram illustrating a method in an embodiment. The method can be run or implemented on a computing environment, for example, shown in FIG. 1, where one or more computer processors may run one or more algorithms for analyzing dependencies among libraries as described herein. At 202, one or more processors recognizes or identifies one or more dependency relationships in libraries from a repository of libraries. For example, an example of such repository can be a public repository, where code modules are available for developers to use in programming. By way of example, there can be a repository of library codes for JAVA programming. Such repository can be kept in a publicly accessible data store or database. Dependency relationships among the libraries can be extracted from the information stored or available in such a repository. For instance, a computer file or document that stores such information can be searched for, retrieved, received and/or read, to identify dependency relationships in libraries.

At 204, one or more machine learning models are created or generated for the libraries. For example, one or more processors extract one or more association rules for the libraries. For instance, based on the dependency relationships identified at 202, one or more machine learning models can be trained to predict dependency relationships. For example, the dependency relationships identified at 202 can be used as training data. One or more machine learning models are trained to predict dependency relationships with confidence values, which indicate how confident the machine learning model is at its prediction result. For example, a machine learning model predicts with a confidence value a dependency between a given library and a target library (e.g., a version of a given library and a version of a target library). An example of a machine learning model is an association rule model created via association rule learning. Briefly, association rule learning is a rule-based machine learning for discovering interesting relations between variables or data in large databases. Association rule learning can identify or discover strong rules that determine certain items are that may be connected.

At 206, one or more processors form or create an L layer tree-like graph. L can be given or pre-configured. For instance, a user may define L. An L layer tree-like graph can be built using an application code and library dependency relationships identified at 202. For instance, an application code or package developed by a user can be used. The application code or package can form a root of the L layer tree-like graph. Such application code or package includes uses or calls (invocations) of various libraries. Those libraries form a first layer of the L layer tree-like graph. Those libraries in turn may use other libraries. Those other libraries form a third layer of the L layer tree-like graph. Such tree building or growing can occur until a stop rule or criteria, which can be, that L layers have been built, and/or a library that has been used in a prior built layer is encountered. Further details are described below.

At 208, one or more processors can determine and recommend the most suitable version of the libraries for use. This can be done using the machine learning models created at 204. For example, for each pair of the nodes having a dependency relationship, a machine learning model (e.g., an association rule model) can be run to identify the dependency relationship with a confidence value. Those pairs of libraries having the largest confidence values can be selected or recommended. Further details are provided below.

At 210, one or more processors may repeat the methods of 202, 204, 206 and 208, periodically. For example, it may be that the repository of libraries is updated, for example, with new libraries or new versions of libraries, and/or include other updates. The processing at 202, 204, 206 and 208 may repeat periodically, for example, to recommend the most up-to-date suitable sets of libraries or versions of libraries to use in an application code or package.

In an embodiment, recognizing one or more dependency relationships of libraries at 202, e.g., existing or saved as part of a public repository, can include extracting information and generating a table or like data structure that relates libraries and their attributes. For example, a table can be generated, where each record of the table can include Library, Version, Frequency and Last Update associated with a library, where Library specifies the name of a library, Version specifies the version of the library, Frequency specifies the number of times the library is used, e.g., in a compile process or model building process, or another process, e.g., by different users, and Last Update specifies the most recent time the library has been used, e.g., by a user. While the description herein refers to a public repository of libraries, any other repository or database containing libraries can be applicable in the present application.

Table 1 shows an example of such a table or data structure that can be generated regarding a plurality of libraries in a library repository. By way of example, the information to build the table such as one shown in Table 1 can be retrieved or acquired from information contained in the library repository. For example, in a library repository such as a maven repository, which is a directory of packaged JAVA archive (JAR) files, a Project Object Model or POM in Extended Markup Language or XML file format can contain information about the libraries, e.g., JAR files, e.g., information about dependencies among JAR files, version numbers, frequency of use and last update time.

TABLE 1

| Library (Lib) | Version | Library (Lib) | Version | Frequency | Last Update |
|---|---|---|---|---|---|
| A | VA-1 | B | VB-1 | 3 | T1 |
| A | VA-1 | C | VC-1 | 2 | T2 |
| A | VA-1 | B | VB-2 | 7 | T3 |

For example, referring to the first row of the table, the first row identifies a dependency relationship as follows: Library A, version VA-1 has dependency relationship with Library B, version VB-1 (e.g., Library A, version VA-1 may have invoked or called Library B, version VB-1 in a code); This may have occurred 3 times, e.g., as logged or specified in the Frequency column (e.g., 3 different users may have used this combination of libraries/versions in their program code, e.g., which could have been at different times); the last time such a combination was used is at time T1, as specified in the Last Update column (e.g., Last Update shows timestamp of last use). Rows 2 and 3 of Table 1 can be interpreted similarly.

Using the data in the table, e.g., dependency relationship and information recorded in the generated table or data structure, one or more machine learning models can be created, for example, one or more association rules can be extracted for the libraries, for example, at 204 in FIG. 2. Briefly libraries are also referred to as libs in computer programming. Based on the dependency relationship table or data structure, the system and/or method can extract association rules for libraries.

Specifically, in an embodiment, the data can be split into M groups according to the "Last Update" item. M can be configurable. For example, the rows of data shown in FIG. 1 can be divided into M groups based on their Last Update time, e.g., such that each group has a number of rows within a range of Last Update time. By way of example, if M is 3, there can be 3 groups of libraries grouped by their update time, e.g., updated less than one month ago, updated between one month to one year ago, and updated more than one year ago. In an embodiment, a group has a weight, which is related to a time period.

The system and/or method can build M association rule models for M groups respectively. For example, an association rule model can be built for a group in the M groups, where each group in the M groups has an association rule model. Each association rule model can be weighted by the weight of its corresponding group. For example, each association rule model has one weight related with a time period of M. Weight of a group can be defined or configured, for example, by a user. For instance, a user may define weight as being 0.333 for each of the 3 groups of M provided as an example above (e.g., updated less than one month ago (group 1), updated between one month to one year ago (group 2), and updated more than one year ago (group 3)).

In another example, a default group weight, W-group, can be used. An example of W-group computation can be:

$$ToNow(T_n) = T_n - T_{now} \quad \text{(Eq. 1)}$$

$$W-\text{group}(n) = \frac{\sum_{i=0}^{i\in Group(n)} ToNow(T_i)}{\sum_{j=0}^{N} ToNow(T_j)}$$

where n represents a group among M groups, $T_n$ represents time step of last update time of group n, and $T_{now}$ represents the time step of the current time or now (e.g., in milliseconds or another time unit), and N represents the number of dependency relationship data, e.g., the number of rows in a table structure such as the one shown in Table 1 for a group. W−group(n) represents weight for group n. In an embodiment, the weight can be larger if closer to the current time or now.

Each association rule model also has one confidence value. A confidence value represents how well or accurate a machine learning algorithm thinks its prediction is, for example, a percentage or likelihood of its prediction being correct. For instance, confidence is defined as part of an association rule, a series of machine learning algorithms, which represents a relationship from a condition to a prediction with a confidence value. In an embodiment, given a condition, an association rule model provides or generates a prediction with a confidence value. For example, an association rule model can be: From Condition to Prediction with Confidence value. In an embodiment, a system and/or method can use such algorithm to build an association model, for example, where Condition is a first Library version and Prediction is a second Library version. Other algorithm that provides a prediction with confidence value given a condition can be used.

By way of example, referring to the data shown in Table 1, an association model can be trained or built using data of the first two columns as Condition and data of the third and fourth columns as Prediction. For example, given that a user is coding or programming, using Library A, version VA-1, a prediction can be generated using a machine learning model (e.g., an association rule model) that recommends a suitable combination of libraries and versions for use with Library A, version VA-1, in this example, which can be any of Library B, version VB-1, Library C, version VC-1, and Library B, version VB-2.

The system and/or method may form L layer tree-like graph that represents relationships among libraries, for example, at 206 in FIG. 2. For example, in such an L layer tree-like graph, a node represents a related lib and version, a branch represents a relationship between one library to another at initial time. The branch, e.g., the relationship from one library to another, can change subsequently by an association rule model. The layer can be formed naturally and need not have specific meanings. For example, if a user uses multiple libraries together there can be many version combinations. In an embodiment, for L layers, the system and/or method can build one tree-like graph. In an embodiment, an L layer tree-like graph can be built based on a user's program, e.g., application package, and the available data about libraries in a repository such as the information that was used in building Table 1, and/or the data of Table 1.

If a user uses multiple libraries together, the system and/or method can define N as the total number of libraries, and each library can be denoted as Lib_n, e.g., where n=1 to N. From Lib_1 to Lib_n, there can be many version combinations. In an embodiment, L as in L layer tree-like graph, can be greater than two such that there are more than two layers in the L layer tree-like graph. For example, there can be libraries used within libraries, e.g., such that layers of the L layer tree-like graph that are grown are deeper than two. A direct call to a lib, for example, a library being invoked or used in a program code directly, is considered a first layer of the L layer tree-like graph. For instance, when a user or developer builds one JAR, that JAR uses several JARs directly, and such direct use forms a first layer. These JARs can have relationships with other JARs, and such other JARs form a second layer. The JARs of the second layer can have relationships with yet other JARS, which can form a third layer, and so forth. In that way, L layers can be formed or built. For L layers, the system and/or method can build one tree-like graph. For example, root is an application JAR. A grow rule can be defined, which stops the building of the L layer tree-like graph. An example of a stop rule in growing the tree can be: the number of layers reach L layer; the lib was already encountered or used before this layer (e.g., a library node being built as a leaf node has been used in a prior layer of the L layer tree-like graph). L can be preconfigured or defined by a user.

Figure 3:
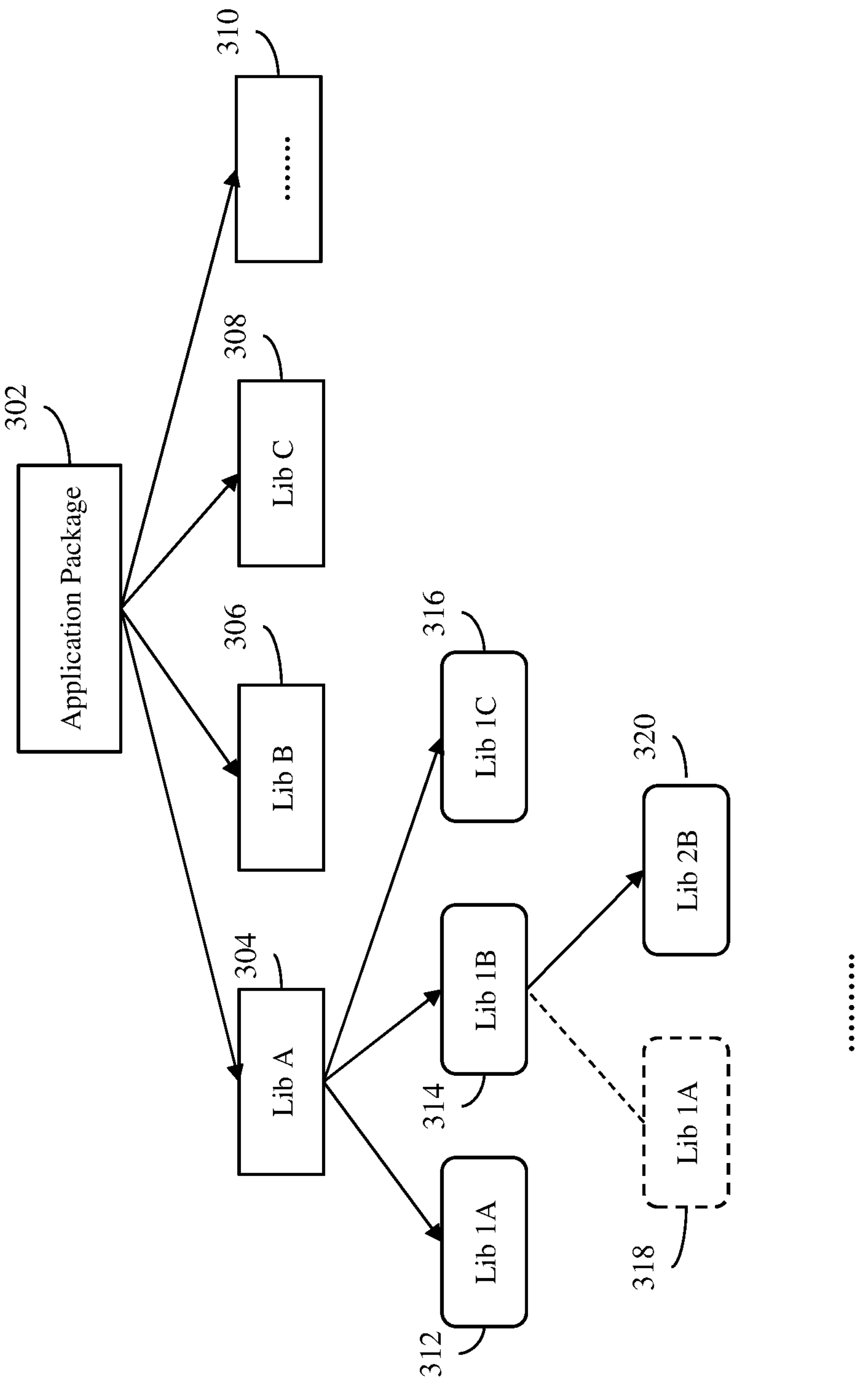
FIG. 3 is a diagram showing an example L layer tree-like graph in an embodiment.

FIG. 3 is a diagram showing an example L layer tree-like graph in an embodiment. An application package 302 represents a code, e.g., written by a developer or user. The application package 302 invokes or uses libraries, e.g., Lib A 304, Lib B 306, Lib C 308. Other libraries can be used by the application as shown at 310. Lib A 304 in turn uses or invokes or depends on, Lib 1A 312, Lib1B 314 and Lib 1C 316. Lib 1B 314 in turn uses or has relationship with Lib 1A 312 (shown as 318 in the tree) and Lib 2B 320. The L layer tree-like graph can be built by creating a node for each library invoked or used in a code (e.g., application package 302), then for each library used (or having dependency or relationship) within those libraries, additional layers can be built. Building of the tree can stop based on the stop rule or criteria, for example, specified above, e.g., either L layers have been created or built, or a library that was already used is again used. For example, in the example shown, once the leaf node 318 is encountered or built, the tree growing in this branch stop, since Lib 1A was already encountered at 312 in the second layer. For example, the application package forms a root of the L layer tree-like graph, libraries used in the application package form nodes of a first layer of the L layer tree-like graph, and libraries used in the nodes of the first layer form nodes of a second layer of the L layer tree-like graph, where a subsequent layer of the L layer tree-like graph is formed based on library uses in a prior layer of the L layer tree-like graph. The library nodes at 304, 306, 308 and 310 represent direct dependency from the application package 302. The library nodes at 312, 314 and 316 represent indirect dependency from the application package 302. Both direct and indirect dependency can have different versions. For instance, each library represented in the nodes can have different versions of the library.

Considering that Lib A 304, Lib B 306, Lib C 308 are from a repository of libraries (e.g., a public repository), which has been coded by a third party, dependencies between the first layer and the subsequent layers may be outside the control of the developer. It can also be noted that, in an aspect, from the second layer, the use of combinations of different libraries or versions may be always accurate because they have been coded, tested and used by a third party, for example, for use by others or for public use. Thus, in an embodiment, the system and/or method may collect and/or determine version combinations for different first layer library versions. For example, given that a user would like to use Lib A 304, Lib B 306, Lib C 308 in an application package 302, an association rule model can be invoked or run to predict versions of Lib A 304, Lib B 306, and Lib C 308, which are compatible together. Such versions can be identified based on the confidence value of the prediction results.

The system and/or method may determine and recommend the most suitable version, based on the L layer tree-like graph, and using association rule models or machine learning models, e.g., which are trained as described above. In an embodiment, the system and/or method can calculate the weighted mean confidence value, which is formed from association rule results. Based on the weighted mean confidence value, the system and/or method can decide on a version, e.g., exact version, on each node of tree-like graph. For instance, an association rule model can be invoked, given a library (and version of that library), and the association rule model can generate a prediction of one or more libraries and/or versions of libraries with confidence values.

For example, for each library version combination, there can be one partial tree or subtree and the system and/or method can calculate the weighted mean confidence value from or using association rule results for that subtree. For example, from layer N−1 to N, the system and/or method can acquire one weighted value from layer N and so the system and/or method can acquire the first layer confidence value. One node has P leaf nodes, therefore, the confidence can be computed as:

$$W=\sum_{n=1}^{P} W_n * C_n \qquad \text{(Eq. 2)}$$

where $W_n$ can be calculated from this formula, and $C_n$ is a confidence value from this node to leaf node determined in an association rule. $W_n$ represents weight associated with nodes of a tree-like graph (e.g., which can represent versions of libraries). The formula above can be regarded as a loop process. For instance, consider that in one tree-like graph, one node has P leaf nodes. On the last layer, each $W_n$ can be preset or preconfigured to be 1, e.g., as a default value, which can also be changed by a user. On the penultimate layer, each $W_n$ is calculated by the above formula. The computation of W can continue thusly, from the bottom to the top of the tree-like graph, and the final W can be acquired on a subtree.

For example, referring to FIG. 3, a subtree can contain nodes starting from Lib A 304 and include Lib A 304, Lib 1A 312, Lib 1B, 314, Lib 1C 316, Lib 1A 318 and Lib 2B 320. In each (or one or more of) library node 304, 312, 314, 316, 318 and 320, there can be multiple versions of the library. A confidence value can be determined by using an association rule model that predicts relationships between libraries with confidence values.

For the first layer, the system and/or method can calculate the total confidence for the root node. In an embodiment, for performance, the system and/or method can cut off leaf node whose confidence value is less than a predefined value. If there exist J leaf nodes in the first layer from the root node, the system and/or method can calculate K1*K2* . . . *KJ=Kn confidence values, where K1, K2, . . . , KJ are the number of versions respectively in leaf nodes 1, 2, . . . J, and Kn can be the number of version combinations from root to the first layer node. For instance, Lib A 304 can have 3 versions, Lib B 306 can have 4 versions, Lib C 308 can have 5 versions. So for example, K1 can be 3, K2 can be 4 and K3 can be 5, where J is 3. The system and/or method can then use the largest value combination as a temporary final version in a group. For instance, the version having the largest confidence value in K1 group, the version having the largest confidence value in K2 group and the version having the largest confidence value in K3 can be used in recommendation. In the recommended combination of libraries, there can be one version recommended for each library node in the subtree, e.g., starting at 304. That one version, e.g., has the largest confidence value out of all other versions.

Figure 4:
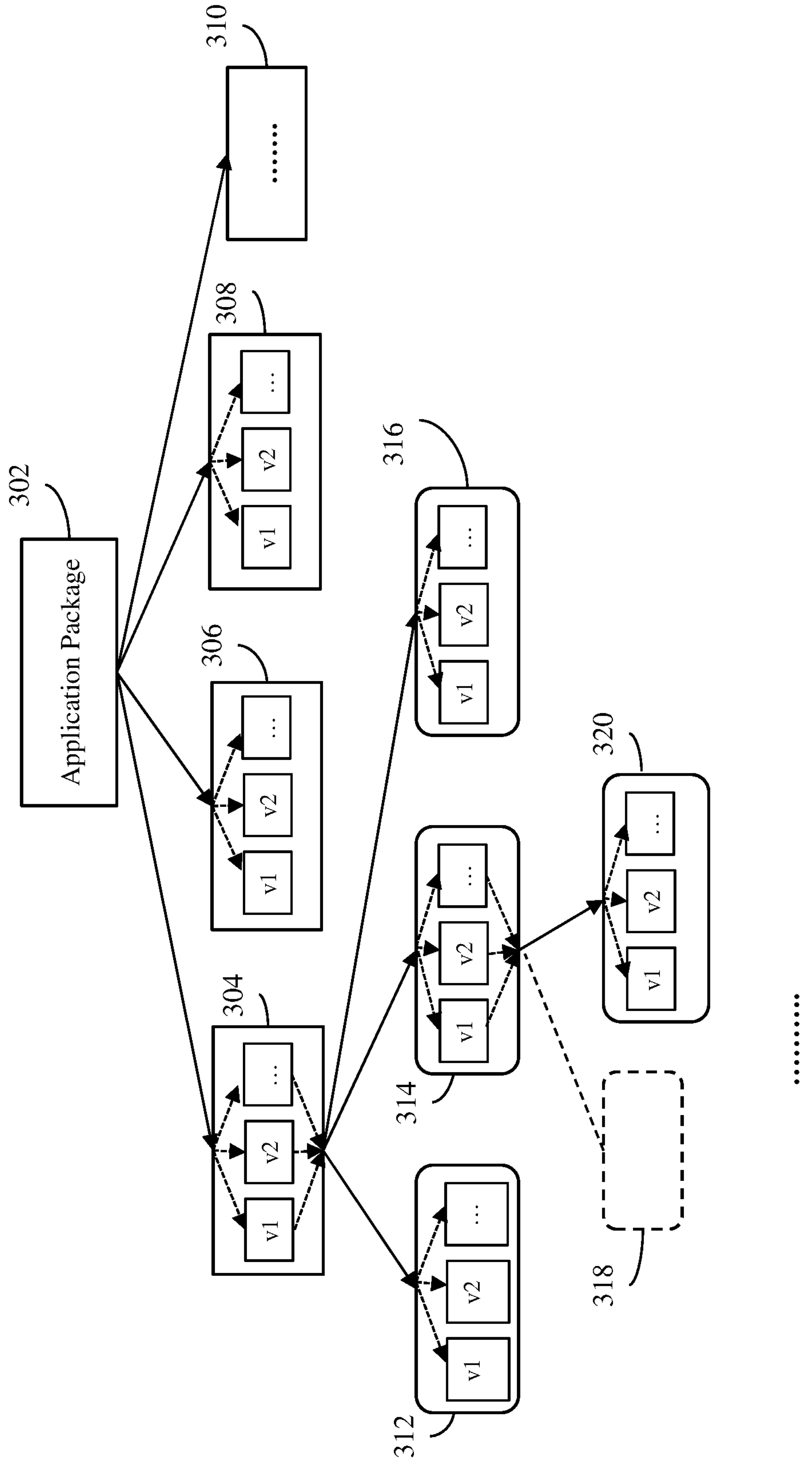
FIG. 4 is a diagram showing an example L layer tree-like graph in more detail showing different versions of a library represented in a node in an embodiment.

For example, referring to Eq. (2) above, W can represent the total calculated confidence of relationships among a library combination in a subtree. One subtree can contain a direct dependency library and related indirect dependency libraries (e.g., described with reference to FIG. 3). If one version is selected in each node (also referred to as library node), the system and/or method (e.g., a computer processor) can acquire one W on this version combination. Both direct and indirect dependency node can have different version combination. The system and/or method can acquire different W based on this different version combination. As a simple example, on a subtree structure, the system and/or method can acquire different total confidences with different version combinations. The number of the different total confidence is Kn described above. FIG. 4 is a diagram showing an example L layer tree-like graph in more detail showing different versions of a library represented in a node in an embodiment. One or more library nodes (by way of example, node at 304) can have one or more versions. While the drawing shows a plurality of versions in the each of the nodes, it is noted that some of the library nodes can have one version, that is, not all nodes need have multiple version.

Because there are M association rule models, the system and/or method can still consider M group weights when comparing among different groups. For instance, in computing the temporary final version in a group of versions, M association rule models can be used. The confidence values resulting from the M association rule models can be compared, and the prediction result having the largest confidence value can be selected. In an embodiment, the selected version can be the final version, which can be recommended. In another embodiment, the associate rule model among the M association rule models, which is the most recent time period category can be used to compute the above temporary final version, then that temporary final version can be provided as a recommendation.

In an embodiment, a record can be updated, for example, the library dependency can be rebuilt based on updated repository information and updated M groups can be formed in one time cycle. In another aspect, the information in the library repository can be updated, since third party developers may develop new code or new versions of code and upload to the library repository. The records in a data structure such as shown in Table 1 can be updated, and updated M groups can be formed in one time cycle. Association rule extraction can be performed, and L layer tree-like graph can be built based on the updated record and M groups. Based on the updated L layer tree-like graph, different recommendation can be suggested at that time cycle.

For example, in one time cycle, such as one month, the system and/or method can collect the latest record in Table 1 and group the new data. The processing then can repeat. If there exists a failed compile combination that was chosen or recommended (e.g., based on feedback from actual compilation or use), the system and/or method can fix all the Wn's to zero in the failed or conflicting combination.

The system and/or method in an embodiment can avoid using conflicting or mismatching combinations of libraries, when in use such as in compiling of the codes with such libraries. Development process can become more efficient and save time in debugging a program code, e.g., requiring minimal changes to codes. The system and/or method can provide library combination recommendations, which would work, before a user compiles the code.

With the system and/or method, a machine learning algorithm based on a library repository such as the public library repository, may be used to acquire the most useful combination of libraries and/or versions of libraries.

The system and/or method can be applicable in applications that use third party libraries and where there can be conflicting versions of such libraries available. The system and/or method can be also applicable for third party library upgrades that address security vulnerability issues.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:

identifying, by at least one computer processor, dependency relationships among libraries in a repository of libraries;

training, by at least one computer processor, at least one machine learning model that predicts with a confidence value a dependency between a given library and a target library, the training using the dependency relationships among libraries;

creating, by at least one computer processor, an L layer tree-like graph, using the dependency relationships among libraries and an application package, wherein L is configurable; and predicting by the at least one machine learning model executing on the at least one computer processor for each pair of nodes having a dependency relationship in the L layer tree-like graph, the dependency relationship with a confidence value, the at least one machine learning model outputting versions of the libraries to use in the application package being programmed and compiled via the at least one computer processor, wherein pairs of nodes having largest confidence values are selected as the versions of the libraries to use in the application package, using the versions of the libraries in the application package reducing compilation errors caused by conflicting library codes in the application package from occurring on the at least one computer processor.

2. The computer-implemented method of claim 1, wherein the at least one machine learning models includes at least one association rule model created via association rule learning.

3. The computer-implemented method of claim 1, wherein the application package forms a root of the L layer tree-like graph, libraries used in the application package form nodes of a first layer of the L layer tree-like graph, and libraries used in the nodes of the first layer form nodes of a second layer of the L layer tree-like graph, wherein a subsequent layer of the L layer tree-like graph is formed based on library uses in a prior layer of the L layer tree-like graph.

4. The computer-implemented method of claim 3, wherein the L layer tree-like graph is grown until a stop criterion is met.

5. The computer-implemented method of claim 4, wherein the stop criterion includes that a number of reached L layers, where L is a preconfigured number.

6. The computer-implemented method of claim 4, wherein the stop criterion includes that a library node being built as a leaf node has been used in a prior layer of the L layer tree-like graph.

7. The computer-implemented method of claim 1, wherein the at least one machine learning model includes M machine learning models, each of which correspond to a group of the dependency relationships of the libraries, grouped according to a time stamp of use of the libraries.

8. The computer-implemented method of claim 7, wherein each of the M machine learning models has an associated weight.

9. A computer program product comprising a computer readable storage medium having program instructions embodied therewith, the program instructions readable by a device to cause the device to:

identify dependency relationships among libraries in a repository of libraries;

train at least one machine learning model that predicts with a confidence value a dependency between a given library and a target library, training of the at least one machine learning model using the dependency relationships among libraries;

create an L layer tree-like graph, using the dependency relationships among libraries and an application package, wherein L is configurable; and predict by the at least one machine learning model for each pair of nodes having a dependency relationship in the L layer tree-like graph, the dependency relationship with a confidence value, executing of the at least one machine learning model outputting versions of the libraries to use in the application package being programmed and compiled via the at least one computer processor, wherein pairs of nodes having largest confidence values are selected as the versions of the libraries to use in the application package, using the versions of the libraries in the application package reducing compilation errors caused by conflicting library codes in the application package from occurring on the at least one computer processor.

10. The computer program product of claim 9, wherein the at least one machine learning models includes at least one association rule model created via association rule learning.

11. The computer program product of claim 9, wherein the application package forms a root of the L layer tree-like graph, libraries used in the application package form nodes of a first layer of the L layer tree-like graph, and libraries used in the nodes of the first layer form nodes of a second layer of the L layer tree-like graph, wherein a subsequent layer of the L layer tree-like graph is formed based on library uses in a prior layer of the L layer tree-like graph.

12. The computer program product of claim 11, wherein the L layer tree-like graph is grown until a stop criterion is met.

13. The computer program product of claim 12, wherein the stop criterion includes that a number of layers reached L layers.

14. The computer program product of claim 12, wherein the stop criterion includes that a library node being built as a leaf node has been used in a prior layer of the L layer tree-like graph.

15. The computer program product of claim 9, wherein the at least one machine learning model includes M machine learning models, each of which correspond to a group of the dependency relationships of the libraries, grouped according to a time stamp of use of the libraries.

16. The computer program product of claim 15, wherein each of the M machine learning models has an associated weight.

17. A system comprising:

at least one processor;

a memory device coupled with the at least one processor;

the at least one processor configured at least to:

identify dependency relationships among libraries in a repository of libraries;

train at least one machine learning model that predicts with a confidence value a dependency between a given library and a target library, training of the at least one machine learning model using the dependency relationships among libraries;

create an L layer tree-like graph, using the dependency relationships among libraries and an application package, wherein L is configurable; and predict by the at least one machine learning model for each pair of nodes having a dependency relationship in the L layer tree-like graph, the dependency relationship with a confidence value, the at least one machine learning model outputting versions of the libraries to use in the application package being programmed and compiled via the at least one computer processor, wherein pairs of nodes having largest confidence values are selected as the versions of the libraries to use in the application package, using the versions of the libraries in the application package reducing compilation errors caused by conflicting library codes in the application package from occurring on the at least one computer processor.

18. The system of claim 17, wherein the at least one machine learning models includes at least one association rule model created via association rule learning.

19. The system of claim 17, wherein the application package forms a root of the L layer tree-like graph, libraries used in the application package form nodes of a first layer of the L layer tree-like graph, and libraries used in the nodes of the first layer form nodes of a second layer of the L layer tree-like graph, wherein a subsequent layer of the L layer tree-like graph is formed based on library uses in a prior layer of the L layer tree-like graph.

20. The system of claim 19, wherein the L layer tree-like graph is grown until a stop criterion is met.

* * * * *